Nov. 14, 1933.  W. J. HUGHES  1,934,713
FLUID FLOW CONTROLLER
Filed April 10, 1931
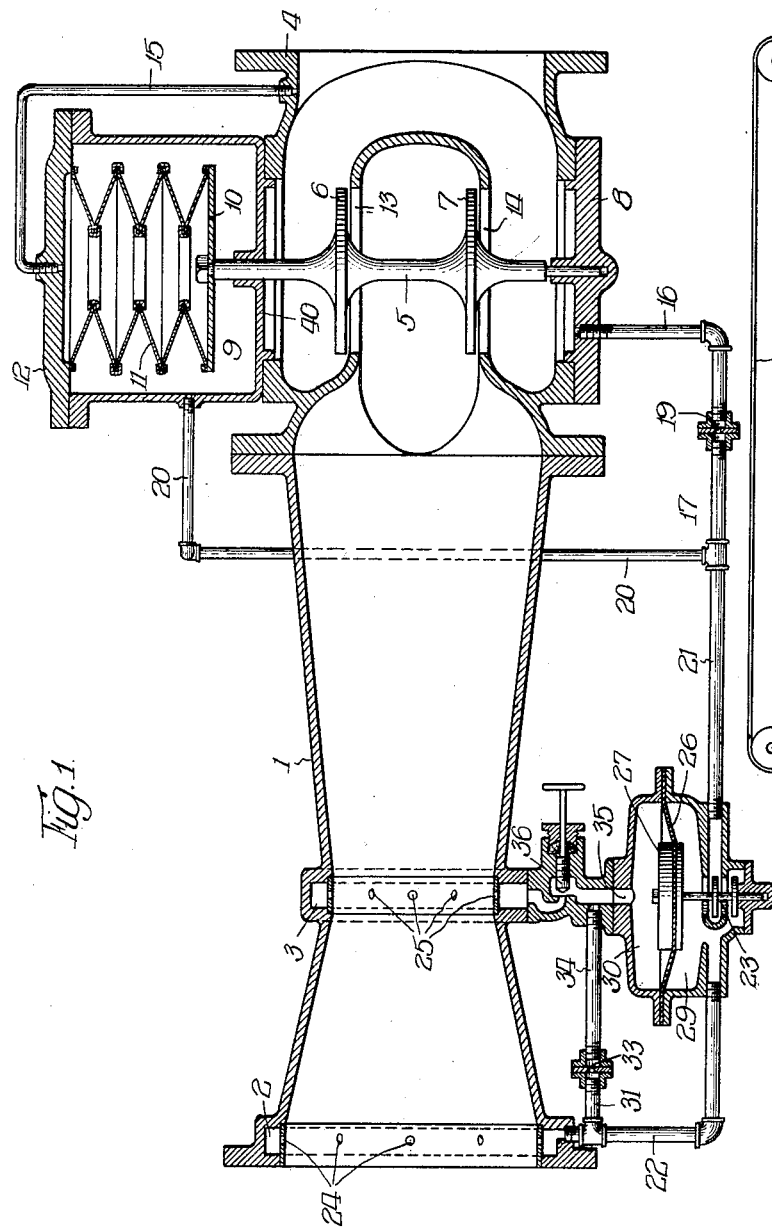
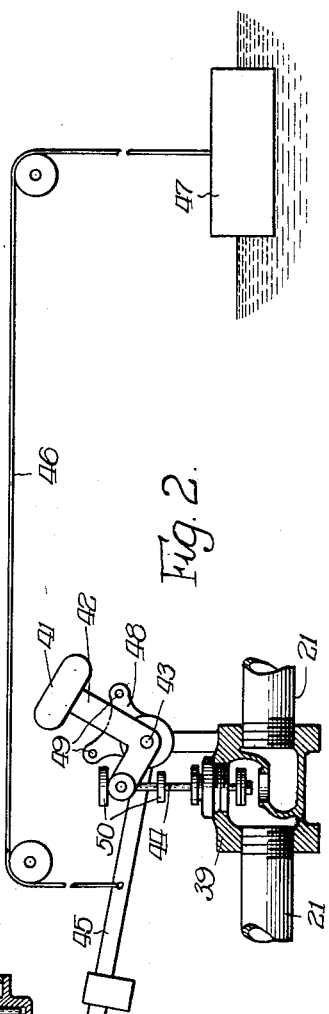
Fig. 1.
Fig. 2.
Inventor:
Walter J. Hughes.

Patented Nov. 14, 1933

1,934,713

UNITED STATES PATENT OFFICE 1,934,713

FLUID FLOW CONTROLLER

Walter J. Hughes, Chicago, Ill., assignor to General Zeolite Co., Chicago, Ill., a corporation of Illinois Application April 10, 1931. Serial No. 529,047

12 Claims. (Cl. 137—152.5)

My invention relates generally to fluid flow controllers. It especially relates to a controller of the type adapted to regulate a flow of fluid through a conduit for the purpose of maintaining a uniform flow in spite of pressure or resistance variation in the system of which it forms a part. Such controllers have many uses in the arts, one of the principal uses being to govern the flow of water through a filter bed such as is used in municipal filtration plants.

One of the principal objects of my invention is to provide a controller wherein the regulating valve will close when the flow is shut off, as by the closing of a valve elsewhere, and which will resume its regulating function starting from a closed position when flow is again permitted. In previous controllers of this type the tendency is for the regulating valve to open wide as the flow ceases. This permits a rapid and in many applications a destructive rush of fluid at the beginning of subsequent operation and until the valve closes enough to provide restriction. To overcome this difficulty hitherto some installations have been provided with hand operated means whereby the regulating valve of a controller could be closed on shutting down of the system and again opened by hand when operation is resumed.

It has also been hitherto proposed to provide attachments to such controllers by which the valve would be caused to close when the flow falls below a certain minimum. These complicate the apparatus, increase the cost thereof, and require setting or adjustment. Also with such devices, usually called reset devices, it has been necessary to leave the valve partly open to permit a certain initial flow in order that the controller would again function. In my improved controller the whole action is automatic as a result of the design of the controller itself, the closing on stoppage of flow and subsequent reopening resulting from the natural play of the forces in the system. Furthermore the regulating valve can and does assume a tightly closed position which has been impossible before except by a hand operated device.

Another object of my invention is the provision of a controller that is more sensitive and quickly responsive by reason of being free from stuffing boxes, heavy counterweights, bearings and other inertia and friction producing parts. The effect of such things is indeterminate and they cannot be compensated for. Controllers subject to them inevitably regulate intermittently and only partially since the beginning of a compensating motion is resisted by both inertia and friction while friction tends to stop a compensating motion short of completion. In my improved controller the regulation is of a floating nature by a balancing of flows and no closely fitting rubbing surfaces are required. This not only secures closer regulation with elimination of hunting but also permits the use of smaller and lighter parts. Furthermore since most of such controllers operate from differential pressure taken from the flow of fluid to be regulated, my improved controller by reason of its greater sensitivity permits lower differentials to be utilized.

Another object is to provide means whereby the controller will act automatically to entirely shut off the flow under certain conditions, as when the reservoir receiving the flow becomes filled.

Another object is to provide a controller that does not require any outside power for its operation but which takes its power from the flow of the fluid being controlled and to do this in a new way so that the controller will be fully operative even when the pressure in the system or a part thereof is below atmospheric.

Hitherto most controllers of this type have utilized some outside power for their operation such as hydraulic power, the controller embodying a relay or pilot valve in some form to apply such power. Some controllers have not required bringing in outside power but, when the fluid being regulated is under sufficient pressure, have utilized power obtained by permitting part of it to escape.

In another type of controller there is no escape of fluid or use of outside power to operate the regulating valve but the latter is connected to a diaphragm on the two sides of which are impressed differential pressures derived from the flow, the motion of the valve resulting from a change in such pressure on one of the sides of the diaphragm. While theoretically this is the simplest and most desirable type it has numerous practical defects. For one thing the diaphragm must be of large size in order to secure the necessary motion without causing tension therein which would absorb part of the differential. This in turn involves heavy counterweights with correspondingly large inertia and friction. Furthermore with controllers of this type it has been found necessary to create differential pressures of considerable amount in order to secure sufficient power and responsiveness and this involves loss as recovery is never complete. In the design of controllers so operated it has been found necessary to compromise between different limitations and losses and at best the apparatus is large and cumbersome and peculiarly subject to hunting.

In my improved controller I overcome the difficulties heretofore met by several new features of design and by a new principle of operation by reason of which my controller functions in a different manner from those heretofore known. Thus I take advantage of the fact that across such a device and particularly across the regulating valve there is inevitably a loss of pressure or head and I utilize this drop or such part as may be necessary as the source of power by which to operate the valve itself, doing this in such a manner that the valve is held in its open regulating position by this drop and consequently closes when the flow ceases. Also to govern the opening of the valve I provide a bypass leading from an upstream point to beyond the valve and establish a controlled flow through this, the control of this bypass flow being by means of a differential taken from the main flow with the result that the parts cooperate to hold the main flow constant at a desired rate. In order to be able to set the controller to different desired rates of flow I provide a secondary bypass leading from the primary bypass flow back into the main flow and a manually operated variable constriction therein.

In order that my invention may be more fully understood I will now describe one embodiment thereof.

Fig. 1 shows a cross sectional view of a controller embodying my invention.

Fig. 2 shows an auxiliary part, partly in cross section.

Referring to Fig. 1, the numeral 1 denotes a Venturi tube having at its inlet an annular recess 2, provided with openings 24 by which the inlet pressure is transmitted to the recess. At the throat section is a similar recess 3 having openings 25. At the discharge end of the tube is a valve 4, preferably of the double seated balanced type, having a vertically moving stem 5 on which are the discs 6 and 7 cooperating with the ports 13 and 14. The lower end of the stem 5 is guided in the lower valve lid 8. At its upper end the stem 5 extends through the bottom plate 40 of the chamber 9 and is attached to the plate 10 which forms the lower end of a bellows or multiple diaphragm 11. The upper end of bellows 11 is attached to the lid 12 which closes the top of chamber 9. A pipe 15 connects the interior of bellows 11 with the outlet side of valve 4. The chamber 9 is connected by pipe 20 to a main bypass comprising pipe 22, valve 23, pipe 21, pipe 17, orifice 19 and pipe 16 and leading from recess 2 to a point on the discharge side of valve 4. Through this bypass and pipe 20 a pressure may be transmitted to chamber 9 greater than that transmitted to the interior of bellows 11 through pipe 15.

The inlet side of valve 23 opens into the diaphragm chamber 29 below diaphragm 26 on which may be mounted a weight 27. The upper diaphragm chamber 30 is connected by passage 35 with the throat recess 3.

The operation of the controller is as follows. Assuming a condition of no flow as by reason of a closed inlet valve anterior to the apparatus, it is apparent that all pressures therein will be equalized and consequently valve 23 will be open by reason of the effect of weight 27 and valve 4 will be closed by the action of the weight of stem 5 and discs 6 and 7.

If now the inlet valve be opened a flow will commence through 22, 23, 21, 17, 19 and 16 to the outlet side of valve 4 and likewise a pressure will be transmitted through pipe 20 to chamber 9 which will exceed the pressure transmitted through 15 to the interior of bellows 11. As a result the valve 4 will be caused to open. If desired a valve, not shown, can be inserted in pipe 15 whereby the speed of opening and closing of valve 4 may be regulated. As soon as valve 4 begins to open a flow will commence through the Venturi tube 1 setting up a pressure difference between recesses 2 and 3 and on the two sides of diaphragm 26. As the flow increases with the opening of valve 4 this differential will increase until it finally overcomes the downward thrust on diaphragm 26 due to the weight 27 and the weight of the moving parts of valve 23. As a result valve 23 moves to close, with consequent reduction of flow through the main bypass and lessening of pressure in pipes 21 and 17 and so through pipe 20 in chamber 9, until a point is reached where the difference in pressure interiorly and exteriorly of bellows 11 is only sufficient to support the weight suspended thereon without further movement. At this point the system becomes stabilized in a sort of floating equilibrium of a nature to maintain the differential between 2 and 3, and thus the flow through the controller, at a constant. Any change in pressure or resistance elsewhere which has the effect of increasing or decreasing the flow immediately affects the differential between 2 and 3 and is reflected through the action of diaphragm 26 on the opening of valve 23 and thus on bellows 11 which at once moves stem 5 until the opening of valve 4 is changed to compensate for or consume the change elsewhere. When this has occurred equilibrium is again established with a different opening of valve 4 but with the same differential and flow across the venturi as before.

Orifice 19 permits a flow to exist through the bypass whenever the controller is functioning and so allows diaphragm 26 and valve 23 to cooperate as a floating control which is more sensitive than a start and stop control. At the same time by reason of the restriction to flow of orifice 19 a pressure can be built up in pipes 21 and 20 and chamber 9 whereby to move bellows 11 to operate valve 4. Instead of being in the position shown this orifice 19 could be in lid 40, pipes 17 and 16 and then being omitted.

As described so far my controller, while operative, will function to maintain only the one rate of flow that is fixed by the relation of such parts as the areas of the full section and throat of the Venturi tube, the area of diaphragm 26 and the thrust of weight 27, etc. It would involve difficulties to design and construct all these so as to accurately obtain a predetermined desired flow and furthermore it is desirable to be able to set a controller to maintain different flows over a rather wide range. To do this I provide additional means as follows:

A secondary bypass comprising the pipes 31 and 34 and orifice 33 connects the passage 35 with the primary bypass at a point anterior the valve 23. In the passage 35 between the secondary bypass and the recess 3 is provided a valve 36, which may advantageously be of the needle type. The area of orifice 33 should be relatively small compared to that of passage 35, valve 36 and orifices 25, so that when valve 36 is wide open substantially the same pressure will exist in upper diaphragm chamber 30 as in the throat of the venturi.

Valve 36 now provides a means whereby the flow through the controller may be altered and set to any rate desired within the range of the apparatus.

With valve 36 wide open the flow will be established as above described and will be at a minimum since the full effect of the differential existing between 2 and 3 is available across diaphragm 26 to close valve 23. If now valve 36 be partially closed the pressure in chamber 30 will rise due to the flow through orifice 33. This causes diaphragm 26 to fall by reason of weight 27, opening valve 23 and permitting a greater flow and increased pressure in pipe 21 and increasing the pressure in pipe 20 and chamber 9. This causes bellows 11 to raise valve stem 5 opening valve 4 to permit increased flow. As the flow increases the pressure in 3 falls increasing the differential across valve 36 until the flow through 33 is again all absorbed and the pressure in chamber 30 falls until diaphragm 26 again rises to partially close valve 23 restoring the original flow therethrough which is just sufficient in conjunction with orifice 19 to hold valve 4 suspended stationary in its new position. Thus for each setting of valve 36 a different flow through the controller is required to establish equilibrium.

It is to be noted that since the weight on diaphragm 26 is constant there can be only one differential across it that will not cause motion of the connected valve 23 and the same is true as to bellows 11 and valve 4. However, such equilibrium between pressure and weight may exist with either valve in any position of opening. Adjustment or setting of the rate of flow is therefore accomplished by altering the effect of the throat pressure in 3 on the one side of control diaphragm 26 while the other side is subject to the full upstream pressure, whereby the differential across 26 is constant with different differentials in 2 and 3 resulting from different flows through the Venturi tube.

In order to simplify calculations as to construction and to facilitate setting of flow at a desired rate a suitably graduated barometric tube, not shown, can advantageously be placed in a bypass connecting chambers 2 and 3.

My controller permits more accurate operation and with lower differential across the venturi than has been possible with previous types. This is true because it is not necessary to derive any power from the differential to sustain or move heavy weights or overcome friction. The valve 23 is small and since it serves only to regulate and not to stop a flow the parts can be loosely fitting. The diaphragm 26 can be made as large as desired and the weight 27 small or omitted entirely. Likewise the bellows 11 can be made relatively large and the moving parts of the valve light permitting the ports 13 and 14 to be large so as to reduce to a minimum the frictional loss due to flow through the valve 4. In this way the overall loss through my improved controller is reduced to a minimum, which becomes important in cases where the total head available to cause flow is small, as is frequently the case.

In Fig. 2 is illustrated an auxiliary part that may at times be advantageously incorporated in my controller, whereby to cause the valve 4 to close and shut off the flow through the controller, as upon the reservoir supplied through the controller becoming filled. The device consists of a valve 39 adapted to be placed in the pipe 21 intermediate pipe 20 and valve 23, whereby the flow through the main bypass may be cut off. When this is done the pressure in chamber 9 will through pipes 20, orifice 17 and pipes 16 become equalized with that on the discharge side of valve 4 and so with the pressure within bellows 11, whereupon valve 4 will close.

The valve 39 may be of any suitable kind and may be operated in any suitable manner as by hand or otherwise. As illustrated it is of the trip type adapted to be quickly thrown from the open to shut position and vice versa. The tripping weight 41 is mounted on one arm of the bell crank 42, pivoted at 43, the other arm cooperating with the stops 50 on stem 44 of the valve 39. As the weight 41 falls to the right it will open the valve and as it falls to the left close the valve. Another bell crank, also pivoted at 43, has a weighted arm 45 to which is attached the cord 46 leading to the float 47 on the surface of the water in the reservoir. The other arm 48 of this bell crank carries stops 49 cooperating with arm 42. It is evident that as float 47 rises arm 45 will fall bringing the right hand stop 49 into engagement with 42 and carying it to the left until it falls closing valve 39 and thus valve 4 as described. When the level in the reservoir falls, float 47 will raise arm 45 until the left hand stops 49 engages arm 42 carying it to the right until weight 41 falls to the right opening 39 and so restoring the controller to operative condition.

I have described one form in which my invention may be embodied. I am aware that some parts can be substituted by equivalents and that numerous changes as to form and arrangement may be made and will suggest themselves to those skilled in the field to which this pertains, whereby the advantages of my invention may be secured in apparatus of quite different appearance.

It is to be understood therefore that the description and drawing herein are for the purpose of exemplification only and I do not propose limiting the patent granted except as necessitated by the prior art and short of the broadest permissible interpretation of the appended claims.

What I claim is:

1. A flow controller comprising a Venturi tube and a valve, means for utilizing a portion of the overall loss of head through the said tube and valve for opening the said valve, and means coacting with the Venturi head for dissipating the unused portion of the said overall loss.

2. A flow controller comprising a Venturi tube, a valve and a bypass around the said tube and valve, a secondary bypass from the first said bypass to the throat of the said tube, a variable restriction and an orifice in the first bypass, an orifice in the secondary bypass, a pressure sensitive device adapted to regulate the variable restriction, and means coacting with the orifice in the first said bypass for opening the said valve.

3. A flow controller comprising a Venturi tube and a self-closing valve, a pressure responsive means for opening the said valve, means for utilizing a portion of the loss through the said tube and valve for energizing the pressure responsive means, and means including an adjustable part coacting with the Venturi head for dissipating the unused portion of the said loss in a manner to effect a balance between the energizing force and the self-closing tendency of the said valve.

4. A controller comprising a Venturi tube, a valve and a bypass leading from said tube around said valve, means coacting with the Venturi head for regulating the flow through the said bypass, means utilizing the said bypass flow for opening the said valve, and means for varying the effectiveness of the Venturi head on said coacting means.

5. A controller comprising a Venturi tube, a self-closing valve, a bypass from the said tube around said valve, a self-opening valve and an orifice in the said bypass, means coacting with the Venturi head tending to effect closure of the self-opening valve, on increase of flow through the venturi, means utilizing the orifice head to effect opening of the self-closing valve, and adjustable means to vary the proportion of the Venturi head effective on said coacting means.

6. In combination in a flow control apparatus, a main controller comprising a Venturi tube and a valve, an auxiliary controller in a bypass around the main controller comprising a valve, an orifice in said bypass, means coacting with the orifice head for opening the main controller valve and means coacting with the Venturi head for closing the bypass valve of the auxiliary controller.

7. A method of flow control which comprises establishing a bypass flow around a section of the main flow, effecting resistance to the main flow as the bypass flow decreases, varying the resistance to the bypass flow simultaneously with variations in the main flow, and varying the relation between the magnitude of the main flow and the variations in resistance to the by-pass flow.

8. In a flow controller and shut off for same, a Venturi tube, a substantially tight closing controller valve, and a bypass around the said tube and valve the bypass having a valve whose closure is effected by increases in the Venturi head, an externally actuated valve for stopping flow therein, and an orifice whose head is utilized to open the controller valve, the externally actuated valve providing means to nullify the said orifice head and close the controller valve.

9. In a rate of flow controller and rate setting device for same a Venturi tube, a valve, a primary bypass around the said tube and valve the said bypass having an orifice and a variable restriction, means actuated by the pressure differential across the said orifice for opening the said valve, a secondary bypass from the primary bypass to the throat of the Venturi tube the secondary bypass having an orifice and an adjustable valve, a pressure sensitive means coacting with the variable restriction of the primary bypass, the said means being actuated by the pressure differential across the last said orifice, and means comprising the adjustable valve and the last said orifice for effecting a loss in the secondary bypass equal to the Venturi head.

10. A flow controller comprising differential pressure producing means and a regulating valve and means whereby a controlled portion of the loss of head across the said differential producing means and said valve is utilized to operate said valve.

11. A flow controller comprising a Venturi tube and a valve, means for utilizing a portion of the overall loss of head through the said tube and valve for opening the said valve and adjustable means coacting with the Venturi head for dissipating the unused portion of the said overall loss.

12. In a fluid flow controller comprising a device for deriving a differential pressure from the flow and a regulating valve, the combination with means for utilizing the loss of pressure across the regulating valve to effect positioning thereof that includes a by-pass flow around said regulating valve, of means for governing said bypass flow that includes a second by-pass flow between two points on said differential deriving device.

WALTER J. HUGHES.